United States Patent

[11] 3,615,739

[72] Inventors Denis Varsanyi
 Arlesheim, Baselland;
 Willy Roth, Strengelbach, Aargau, both of Switzerland
[21] Appl. No. 846,272
[22] Filed July 30, 1969
[45] Patented Oct. 26, 1971
[73] Assignee Geigy Chemical Corporation
 Ardsley, N.Y.
[32] Priority Dec. 31, 1963
[33] Switzerland
[31] 16070/63
 Continuation-in-part of application Ser. No. 672,702, , now abandoned , which is a continuation-in-part of application Ser. No. 421,693, Dec. 28, 1964, now Patent No. 3,374,235, and a continuation-in-part of 560,855, June 27, 1966, now abandoned , and a continuation of 645,467, June 12, 1967, now Patent No. 3,410,855.

[54] FLOOR POLISHING COMPOSITION CONTAINING SUBSTITUTED -TRIAZINES
 15 Claims, No Drawings

[52] U.S. Cl. ..................................................... 106/10,
 106/11, 106/231, 106/237, 106/239, 106/271,
 117/138.8, 117/139, 117/148, 117/149, 117/168,
 260/28

[51] Int. Cl. ...................................................... C08h 9/06,
 C09f, C09g 1/08
[50] Field of Search .......................................... ˙106/3-11,
 270-272, 231, 237, 239; 260/249.6, 28.5

[56] References Cited
 UNITED STATES PATENTS

| | | | |
|---|---|---|---|
| 2,909,421 | 10/1959 | Gysin et al. .................. | 260/249.6 |
| 3,108,029 | 10/1963 | Wohnsiedler et al. ......... | 260/249.6 X |
| 3,143,548 | 8/1964 | Vail et al. ...................... | 260/249.6 |
| 3,244,713 | 4/1966 | Dowbenko et al. ............ | 260/249.6 |
| 3,265,690 | 8/1966 | Matter et al. ................... | 260/249.6 |
| 3,277,059 | 10/1966 | D'Alelio ......................... | 260/249.6 X |
| 3,278,253 | 10/1966 | Weckler et al. ................ | 260/249.6 X |
| 3,366,601 | 1/1968 | Cragar et al. ................... | 260/249.6 X |
| 3,374,235 | 3/1968 | Varsanyi et al. ............... | 260/249.6 |
| 3,410,855 | 11/1968 | Varsanyi et al. ............... | 260/249.6 |
| 3,419,535 | 12/1968 | Schlumbom ................... | 260/249.6 X |

FOREIGN PATENTS

| | | | |
|---|---|---|---|
| 922,830 | 4/1963 | Great Britain ................ | 106/3 |

Primary Examiner—Julius Frome
Assistant Examiner—Joan B. Evans
Attorneys—Karl F. Jorda and Martin J. Spellman

ABSTRACT: Surface treating agents containing as waxy, gloss-imparting component a trisamino-s-triazine derivative in which one of the three amino groups is substituted by a radical -Q-Y in which Q is an alkylene or alkenylene radical and Y represents certain hydrophilic substituents.

FLOOR POLISHING COMPOSITION CONTAINING SUBSTITUTED -TRIAZINES

This application is a continuation-in-part of our Pat. application Ser. No. 672,702, now abandoned which is in turn a continuation-in-part of our Pat. applications: Ser. No. 421,693, filed Dec. 28, 1964, now U.S. Pat. No. 3,374,235, Ser. No. 560,855, filed June 27, 1966, now abandoned; and Ser. No. 645,467, filed June 12, 1967, now U.S. Pat. No. 3,410,855.

DESCRIPTION OF THE INVENTION

The present invention concerns surface treating agents which contain trisamino-s-triazine derivatives, as well as new trisamino-s-triazine derivatives which are useful as waxy components of such agents.

By "surface treating agents" in the present description are meant agents which can be used for the protection and conservation, e.g. by coating or waxing, of surfaces of all types such as, for example, agents for the treatment of surfaces of inorganic materials, e.g. metal, stone, tile, etc. and of organic materials, e.g. wood, leather, synthetic plastics such as linoleum, etc., textiles and paper.

More in particular, the surface treating agents according to the invention serve as floor polishes to render floors of all kinds of material smooth and glossy, while at the same time having an antislip effect. Floors to which the agents according to the invention have been applied, show a fine gloss, many of the novel s-triazine derivatives being self-polishing, or the gloss of such treated floors and the like surfaces can be enhanced by subsequent rubbing with a soft cloth or the like well-known techniques. Floor polishes according to the invention can be applied to unsealed as well as to sealed floors.

However, the surface-treating agents according to the invention are not, themselves, wood-sealing agents; the latter are resinous compounds which close up the pores of floors made of wood or the like permanently or at least for a great length of time, e.g. for several years.

We have found that important components preferably in oil-based formulations of surface treating agents according to a first aspect of the invention are trisamino-s-triazine derivatives of the general formula

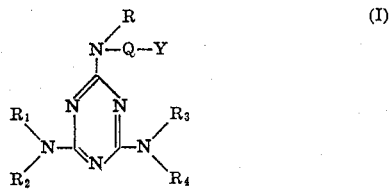

(I)

wherein $R$, $R_1$ $R_3$ independently of each other represent hydrogen or optionally substituted aliphatic hydrocarbon radicals, $R_2$ and $R_4$ represent optionally substituted aliphatic hydrocarbon radicals, but at least $R_4$ must be a lipophilic group which is selected from the group consisting of alkyl and alkenyl, each of at least 10 and up to 22, and preferably from 10 to 18 carbon atoms, Q represents an alkylene or alkenylene radical, and Y represents a hydrophilic substituent as defined below.

By optionally substituted aliphatic hydrocarbon radicals such as are represented by R, $R_1$ to $R_4$ in general formula I are meant straight or branched chained alkyl or alkenyl radicals containing one to 22 carbon atoms, which radicals, for example, can be substituted by the hydroxyl group and/or one or more halogen atoms such as, e.g. fluorine or chlorine, or cycloalkyl radicals.

By hydrophilic substituents represented by Y in the general formula I are meant, in particular, ionogenic hydrophilic substituents, both acid as well as basic groups, and also nondissociating hydrophilic groups, such as e.g. the following: the carboxyl, sulfonic acid, carbamyl, sulfamyl, mono- or di-N-alkyl-sulfamyl, alkoxycarbonyl, hydroxy-alkoxy-carbonyl, N-alkyl-carbamyl, N-hydroxyalkyl- carbamyl, N-hydroxyalkyl-N-alkyl-carbamyl, N,N-di(hydroxy-alkyl)-carbamyl, the hydroxyl or an aminoalkoxy-carbonyl group, all above-defined aliphatic radicals having at most 22, but preferably not more than 18 carbon atoms.

The alkylene or alkenylene radicals represented by Q in general formula I preferably have straight chains and can contain one to 20 carbon atoms.

The compounds of general formula I are obtained by reacting, in any order desired, 2,4,6-trichloro-s-triazine with amines of the general formulas II, III and IV:

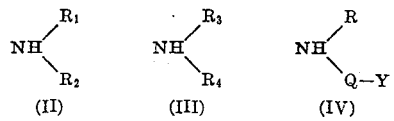

wherein R, $R_1$, $R_2$, $R_3$, $R_4$, Q and Y have the meanings given above. The reactions can be performed in the presence of a solvent which is inert to the reaction partners, a proton acceptor and an inert gas.

Preferably the 2,4,6-trichloro-s-triazine (cyanogen chloride) is reacted first with an amine of the general formula II or III at 0°-5° C. (exothermic reaction), then with an amine of the general formula III or II, respectively, at 40°-60° c., and finally with an amine of the general formula IV at 150°-175° C. The third chlorine atom is preferably substituted in the presence of a higher boiling aliphatic hydrocarbon, for instance a petroleum fraction boiling at 100°-170° C., as solvent.

The solvents usual for reactions of cyanogen chloride and amines such as water, chloroform, mixtures of acetone and water, and mixtures of other organic solvents and water, are used as solvents for the first and second steps.

The trisamino-s-triazine derivatives of the general formula I wherein Y is an acid hydrophilic substituent which forms anions, can be isolated in the form of their metal and ammonium salts, preferably in the form of their alkali metal salts.

The compounds wherein Y is a functional carboxylic acid derivative can be produced by a variation of the process described above by reacting, in the known manner, a compound of general formula

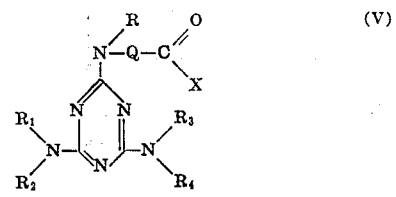

(V)

wherein R, $R_1$, $R_2$, $R_3$, $R_4$ and Q have the meanings given above and X is a halogen atom, a lower alkoxy radical, the phenoxy radical or the hydroxyl group, with an alkanolamine, dialkanolamine, alkenylenediamine or alkane diol.

"Lower" as used in this specification and in the appended claims in relation to an aliphatic radical, e.g. alkyl, means that such radical has at most five carbon atoms.

Preferred compounds due to their outstanding surface-treating properties are those of the following four classes:

I. Compounds which in their free acid form are of the formula

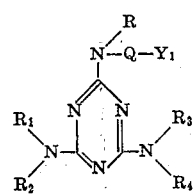

wherein each of R, $R_1$ and $R_3$ represents a member selected from the group consisting of hydrogen, alkyl of from one to 22 carbon atoms, cycloalkyl of from five to 12 ring carbon atoms, alkenyl of from three to 22 carbon atoms, hydroxy-alkyl of from two to 22 carbon atoms, fluoroalkyl of from three to 22 carbon atoms, and chloro-alkyl of from three to 22 carbon atoms, all aforesaid aliphatic groups having preferably not more than 20 carbon atoms, and cycloalkyl preferably six to 12 carbon atoms.

$R_2$ represents a member selected from the group consisting of alkyl of from one to 22, and preferably not more than 20 carbon atoms, cycloalkyl of from five to 12 and preferably six to 12 ring carbon atoms, alkenyl of from 3 to 22 and preferably three to 20 carbon atoms, hydroxy-alkyl of from two to 22, and preferably three to 20 carbon atoms, fluoroalkyl of from three to 22 and preferably three to 20 carbon atoms, and chloro-alkyl of from three to 22 and preferably three to 20 carbon atoms, $R_4$ represents a lipophilic radical, as defined in Formula I, Q represents a member selected from the group consisting of alkylene of from one to 20 carbon atoms and alkenylene of from three to 20 carbon atoms, and $Y_1$ represents a member selected from the group consisting of -$COO^1M^+$ and -$SO_3{}^1M^+$; $M^+$ represents an equivalent weight of a monovalent, divalent or trivalent, preferably noncolor imparting cation, e.g. hydrogen, alkali metal, alkaline earth metal or aluminum ions; and in which compounds the total number of carbon atoms in $R_1$, $R_2$, $R_3$ and $R_4$ taken together is preferably at least 12 and most preferably the total number of carbon atoms of the last-named four substituents together with the number of carbon atoms in -Q-$Y_1$ is at least 17; and which substances surpass those of the following classes of this invention in their capacity of imparting a fine gloss to surfaces of the type described to which they have been applied;

II. Compounds which in their free acid form are of the same formula as those of class (I), but wherein $Y_1$ is replaced by $Y_2$ which latter represents a member selected from the group consisting of carbamyl, sulfamyl, mono- and di-alkyl-substituted carbamyl and sulfamyl wherein "alkyl" has from one to 16 carbon atoms, and N-hydroxy-alkyl-substituted carbamyl and sulfamyl wherein alkyl is of from two to six carbon atoms;

III. Compounds which in their free acid form are of the same formula as those of class (I), but wherein $Y_1$ is replaced by $Y_3$ which latter represents a member selected from the group consisting of alkoxy carbonyl of from two to 18 carbon atoms, hydroxy-alkoxy carbonyl of from two to 18 carbon atoms and amino-alkoxy-carbonyl, mono-(lower-alkyl)-amino-alkoxy-carbonyl and di-(lower alkyl)-amino-alkoxy-carbonyl, the "alkoxy" portion in the last three members having from two to six carbon atoms;

IV. Compounds which in their free acid form are of the same formula as those of class (I), but wherein $Y_1$ is replaced by $Y_4$ which latter represents a hydroxyl group, and Q is replaced by $Q_1$ which represents a member selected from the group consisting of alkylene of from 10 to 20 carbon atoms, and alkenylene of from 10 to 20 carbon atoms and wherein $Y_4$ is located at the $Q_1$ radical at least four carbon atoms remote from each of the two free bonds of Q.

The trisamino-s-triazine derivatives of the general formula I have waxlike properties; they are generally hardwaxes, of a hardness of about 1 to 5 as determined by the ASTM penetration method; they are resistant to chemicals, especially to alkalis and acids, and especially to household chemicals; they can be used instead of natural waxes or together therewith for the treatment and finishing of such surfaces as, for example surfaces of inorganic materials, e.g. metal surfaces such as chromed metal parts, polished stone, ceramic tiles, but also as gloss-imparting and surface-protecting agents for surfaces of organic materials, e.g. wood, leather, plastic resinous material such as linoleum, etc.; on automobile bodies, on textiles as hydrophilic agents, and on paper as carriers for copying layers. They have characteristic properties also possessed by natural waxes such as solubility in lipophilic solvents, are compatible with natural and synthetic waxes, can be converted readily to pastes and have good gelling properties, e.g. with organic solvents, particularly with low boiling petroleum fractions, and have a good solvent retaining power. Surfaces treated therewith can be given a high gloss upon light polishing.

The metal and ammonium salts, the addition salts of inorganic and organic acids, and the quaternary ammonium salts of the compounds of general formula I have similar properties and can be used instead of or together with natural waxes for the above-described purposes.

Surface treating agents according to the invention are obtained by mixing a trisamino-s-triazine derivative of the general formula I or several such derivatives with the usual substances which are suitable for the treatment of surfaces, and comprise, as important components, diluting adjuvants compatible with the said triazine derivatives and which are admixed with the latter in sufficient amount for permitting uniform distribution of said agents on surfaces to be treated therewith. Such substances are, for example, (a) body-giving adjuvants such as natural and synthetic waxes, resins, silicones, etc. which improve the physical properties, as well as inorganic and organic fillers, e.g. silicates, milled plastics; (b) solvents; (c) anionic, cationic or nonionic solids-dispersing and emulsifying agents; (d) detergents such as natural and synthetic wetting agents, e.g. soaps; (e) pigments; (f) agents to improve the stability to light; (g) stabilizers of all types such as corrosion inhibitors; and (h) miscellaneous other adjuvants, such as scents, dyestuffs, biocidally active substances or agents containing such substances, e.g. insecticides, fungicides, bactericides, etc.

The content of compounds of Formula I in such agents ranges from 0.2 to about 50 percent of the total weight of the agent.

The surface treating agents according to the invention can be in the form of and used as aerosols, solvents, emulsions, semisolid and solid pastes. The agents can thus serve to protect and to treat surfaces of all types, by which is also included the treatment of paper, e.g. the production of carbon paper.

The following nonlimitative examples illustrate the invention further. Parts and percentages are given therein by weight and the temperatures are in degrees Centigrade.

The production of the compounds used as gloss-imparting agents has been described in our copending Pat. applications Ser. Nos. 421,693 and 560,855, supra.

EXAMPLE 1

370 parts of cyanuric chloride (technically pure) are dissolved by slightly heating in 3,000 parts by volume of carbon tetrachloride in a sulfonating flask and the solution is then cooled to 0°–3°. One thousand seventy-eight Parts of n-octadecylamine (technically pure) in finely pulverized form are then added in portions within about 3 hours while stirring and cooling intensively. Cooling is necessary because the reaction is strongly exothermic. A solution of 220 parts of sodium carbonate (technically pure, dry), dissolved in 1,000 parts by volume of distilled water is then added slowly dropwise within about 40 minutes while cooling well. The reaction mixture is brought to room temperature while stirring and then slowly brought to the boil whereupon it is refluxed for 4–5 hours. The resultant product is cooled to room temperature while stirring, and the solid part is filtered off under suction and washed three times on the filter with 300 parts by volume of carbon tetrachloride.

The filter residue is crushed and dried in about 24 hours in a vacuum dryer at 50°–60°/14–200 Torr. The reaction product is slurried twice with about 6,000 parts by volume of warm distilled water and the water is removed. 2Chloro-4,6-bis-n-octadecylamino-s-triazine is obtained as a snow white powder.

It melts at 139°–140° and the yield is 86 percent of the theoretical.

Forty-two parts of 11-amino-undecyclic acid (technically pure) are then suspended in 500 parts by volume of Special Petrol I and the suspension is heated to 70°–80°. Twenty parts of sodium hydroxide (technically pure), freshly pulverized are then added in small portions within 5 –10 minutes while stirring intensively and the whole is stirred for another 1–1½ hours at a temperature of 70°–80°. One hundred thirty parts of finely pulverized 2-chloro-4,6-bis-n-octadecylamino-s-triazine are then added in portions within about 30–40 minutes while stirring vigorously, The mixture is then stirred under reflux under an atmosphere of nitrogen, for 2 hours at a temperature of 90°–100°, then for 2 hours at a temperature of 130°–140° and finally for 18 hours at a temperature of 160°–170°. The contents of the flask are then cooled to 100° while stirring and the solid part is filtered off on a steam filter upon which there is a 3–4 mm. thick layer of calcined diatomaceous earth (e.g. Hyflo-Super Cel) which has been slurried with gasoline boiling at 160°–170° C. (Special Petrol I). The residue is washed twice with 100 parts by volume of hot solvent each time. The solution obtained, which is barely opalescent, is evaporated to dryness in a rotary evaporator and the residue is dried in a vacuum dryer at 60°–70° under about 14–20 mm. pressure. The sodium salt of 11-[2′, 4′-bis-n-octadecylamino-s-triazinyl-(6′)]-amino-undecylic acid is obtained in a yield of about 98 percent of the theoretical as a pale yellowish product which melts at 188°–190°.

EXAMPLE 2

In a sulfonating flask, 95 parts of cyanuric chloride (technically pure) are dissolved by gently heating in 1,500 parts by volume of carbon tetrachloride and the solution is then cooled to 0°–3°. One hundred thirty-five parts of finely pulverized n-octadecylamine (technically pure) are then added in portions in about 30–40 minutes at 0°–5° while intensively stirring and cooling. Good cooling is necessary as the reaction is strongly exothermic. A solution of 55 parts of sodium carbonate (technically pure, dry), dissolved in 200 parts by volume of distilled water is then added slowly dropwise within 30 minutes while cooling well. Here again, the reaction is exothermic so that good cooling is necessary. The whole reaction mixture is thereupon stirred for 3 hours at this temperature. After the cooling bath has been removed, 101 parts of 11-amino-undecylic acid (technically pure) are added in portions in about 30–40 minutes while stirring vigorously. The inner temperature during this addition is 10°–15°. A solution of 27 parts of sodium carbonate (technically pure, dry), in 100 parts by volume of distilled water is then added dropwise at this temperature within about 15–20 minutes. The whole reaction mixture is then brought to the boil and refluxed for another 5 hours. It is then cooled to room temperature while stirring and mixed, in the flask, with 1,500 parts by volume of acetone. It is filtered under suction, the crude product is dried in a vacuum dryer at 50°–60° under 14–20 Torr: pressure and the organic solvent is removed. The reaction product is then stirred twice with about 5,000 parts by volume of warm distilled water and filtered off under suction. The reaction product is dried in a vacuum dryer at 50°–60° under 14–20 Torr pressure. 11-[2′-chloro-4′-n-octadecylamino-s-triazinyl-(6′)]-amino-undecylic acid in the form of the sodium salt, is obtained as a snow white powder. The yield is about 95 percent of the theoretical and it melts at 138°–140° C.

60.4 parts of 11-[2′-chloro-4′-n-octadecylamino-s-trianzinyl-(6′)]-amino-undecylic acid sodium salt and 52.2 parts of di-n-octadecylamine are dissolved at 70°–80 ° in 500 parts by volume of Special Petrol I, and five parts of finely pulverized sodium hydroxide are added to this solution. The temperature of the reaction mixture is brought to 160°–170° within about 4 hours while introducing nitrogen and the reaction mixture is stirred for about 18 hours at this temperature. After cooling to 100°, the reaction mixture is filtered hot with the aid of Hyflo-Super Cel and then the solvent is distilled off from the filtrate. As residue, the pure sodium salt of 11-[2′-n-octadecylamino-4′-di-n-octa-decylamino-s-triazinyl-(6′)]-amino-undecylic acid is obtained in a yield of about 98 percent of the theoretical. It melts at 98–100°.

Compounds falling under Formula I in which R, -Q-Y, $R_1$, $R_2$, $R_3$ and $R_4$ are the groups given in the following Table, are obtained by the procedure of examples 1 and 2, respectively, but using correspondingly substituted starting materials in equivalent amounts in view of the materials used in the said examples.

TABLE

| Example No. | R | —Q—Y | $R_1$ | $R_2$ | $R_3$ | $R_4$ |
|---|---|---|---|---|---|---|
| 3 | H | $-C_{10}H_{20}COONa$ | H | $n-C_{18}H_{37}$ | H | $n-C_{18}H_{37}$ |
| 4 | H | $-C_{10}H_{20}COONa$ | H | $n-C_{18}H_{37}$ | $n-C_{18}H_{37}$ | $n-C_{18}H_{37}$ |
| 5 | $CH_3$ | $C_6H_{10}COOH$ | $C_2H_5$ | $C_3H_7$ | $CH_3$ | $C_2H_5$ |
| 6 | Allyl | Oleyl—COOH | $CH_3$ | $CH_3$ | $C_3H_7$ | $C_{12}H_{25}$ |
| 7 | β-Hydroxy-ethyl | $C_{10}H_{20}COONa$ | H | $C_6H_{13}$ | $C_3H_7$ | $C_6H_{13}$ |
| 8 | $CF_3-(CH_2)_2-$ | $C_8H_{16}COONa$ | H | $C_8H_{17}$ | H | $n-C_{18}H_{37}$ |
| 9 | $\begin{array}{c} CH_2Cl \\ \| \\ CH_2-CH_2 \\ \| \\ CH_2- \end{array}$ | $C_5H_{10}COOH$ | $C_2H_5$ | $C_2H_5$ | H | $C_{16}H_{33}$ |
| 10 | H | Oleyl—COONa | Allyl | $CH_3$ | Allyl | $C_{18}H_{37}$ |
| 11 | H | $C_{10}H_{20}SO_3H$ | H | Allyl | H | $C_{15}H_{31}$ |
| 12 | H | $C_{12}H_{24}SO_3H$ | $HO-CH_2-CH_2-$ | $HO-CH_2-CH_2-$ | | Oleyl |
| 13 | $C_2H_5$ | $C_{10}H_{20}SO_3H$ | $C_2H_5$ | $C_2H_5$ | $\begin{array}{c} HO-CH_2 \\ \| \\ CH_2- \end{array}$ | $C_{12}H_{25}$ |
| 14 | H | $C_5H_{10}COOK$ | $Cl-CH_2-CH_2-$ | $\begin{array}{c} Cl-CH_2-CH_2 \\ \| \\ CH_2- \end{array}$ | $CH_3$ | $C_{18}H_{37}$ |
| 15 | H | $CH_2-SO_3H$ | H | ⬡H | H | ⬡H |
| 16 | H | $C_5H_{10}COOH$ | $C_2H_5$ | $C_2H_5$ | H | Tricyclododecyl |
| 17 | H | $-C_{10}H_{20}COONa$ | H | $n-C_3H_7$ | H | $n-C_{18}H_{37}$ |
| 18 | H | $-C_{10}H_{20}COOH$ | H | $n-C_4H_9$ | H | $n-C_{18}H_{37}$ |
| 19 | H | $-C_{10}H_{20}COONa$ | H | $n-C_4H_9$ | H | $n-C_{18}H_{37}$ |
| 20 | H | $-C_{10}H_{20}COOK$ | H | $n-C_6H_{13}$ | H | $n-C_{18}H_{37}$ |
| 21 | H | $-C_{10}H_{20}COOH$ | H | $n-C_6H_{13}$ | H | $n-C_{18}H_{37}$ |
| 22 | H | $-C_{10}H_{20}COOH$ | H | $n-C_{10}H_{33}$ | H | $n-C_{18}H_{37}$ |
| 23 | H | $-C_{10}H_{20}COOH$ | H | $n-C_{12}H_{25}$ | H | $n-C_{18}H_{37}$ |
| 24 | H | $-C_{10}H_{20}COONa$ | $C_{12}H_{25}$ | $n-C_{12}H_{25}$ | H | $n-C_{18}H_{37}$ |
| 25 | H | $-C_{10}H_{20}COOH$ | $C_{12}H_{25}$ | $n-C_{12}H_{25}$ | H | $n-C_{12}H_{25}$ |
| 26 | H | $-C_{10}H_{20}COONa$ | $C_{12}H_{25}$ | $n-C_{12}H_{25}$ | H | $n-C_{12}H_{25}$ |
| 27 | H | $-C_{10}H_{20}COOH$ | $C_{12}H_{25}$ | $n-C_{12}H_{25}$ | $n-C_{12}H_{25}$ | $n-C_{12}H_{25}$ |
| 28 | H | $-C_{10}H_{20}COONa$ | H | $n-C_{12}H_{25}$ | $n-C_{12}H_{25}$ | $n-C_{12}H_{25}$ |
| 29 | H | $-C_{10}H_{20}COONa$ | H | $n-C_{18}H_{37}$ | H | $n-C_{18}H_{37}$ |
| 30 | H | $-C_{10}H_{20}COOH$ | H | $n-C_{18}H_{37}$ | H | $n-C_{18}H_{37}$ |
| 31 | H | $-C_5H_{10}COOH$ | H | $n-C_{18}H_{37}$ | H | $n-C_{18}H_{37}$ |
| 32 | H | $-C_5H_{10}COONa$ | H | $n-C_{18}H_{37}$ | H | $n-C_{18}H_{37}$ |
| 33 | H | $-C_{10}H_{20}COOH$ | H | $n-C_{18}H_{37}$ | H | $n-C_{18}H_{37}$ |
| 34 | H | $-C_5H_{10}COOH$ | H | $n-C_{18}H_{37}$ | H | $n-C_{18}H_{37}$ |
| 35 | H | $-C_5H_{10}COOH$ | H | $n-C_{18}H_{37}$ | H | $n-C_{18}H_{37}$ |
| 36 | H | $-C_{10}H_{20}COOCaOH$ | H | $n-C_{18}H_{37}$ | H | $n-C_{18}H_{37}$ |
| 37 | $(H)_2$ | $(-C_{10}H_{20}COO)_2AlCl$ | $(H)_2$ | $(n-C_{18}H_{37})_2$ | $(H)_2$ | $(n-C_{18}H_{37})_2$ |
| 38 | H | $-C_{10}H_{20}COOCH_2$ $\| $ $NH_3-CH_2$ $\cdot HCl$ | H | $n-C_{18}H_{37}$ | H | $n-C_{18}H_{37}$ |

TABLE

| Example No. | R | —Q—Y | R₁ | R₂ | R₃ | R₄ |
|---|---|---|---|---|---|---|
| 39 | H | —C₁₀H₂₀COOCH₂O—CH₃ ·NH₃ ·CH₃ ·HCl | H | n-C₁₈H₃₇ | H | n-C₁₈H₃₇ |
| 40 | H | —C₁₀H₂₀COOH | CH₃ | n-C₁₈H₃₇ | CH₃ | n-C₁₈H₃₇ |
| 41 | H | —C₁₀H₂₀COONa | CH₃ | n-C₁₈H₃₇ | CH₃ | n-C₁₈H₃₇ |
| 42 | H | —C₁₀H₂₀COOH | n-C₁₈H₃₇ | n-C₁₈H₃₇ | H | n-C₁₈H₃₇ |
| 43 | H | —C₁₀H₂₀COONa | H | n-C₁₈H₃₇ | H | n-C₁₈H₃₇ |
| 44 | H | —C₁₀H₂₀COOH | H | n-C₁₈H₃₅ | H | n-C₁₈H₃₅ |
| 45 | H | —C₁₀H₂₀COONa | H | n-C₁₈H₃₅ | H | n-C₁₈H₃₅ |
| 46 | H | —C₁₀H₂₀COOH | H | n-C₆H₁₃ | H | n-C₁₈H₃₇ |
| 47 | H | —C₁₀H₂₀COONa | H | n-C₆H₁₃ | H | n-C₁₈H₃₇ |
| 48 | H | —C₁₀H₂₀COOH | H | n-C₁₈H₃₇ | H | n-C₁₈H₃₇ |
| 49 | H | —C₁₀H₂₀COONa | n-C₁₈H₃₇ | n-C₁₈H₃₇ | n-C₁₈H₃₇ | n-C₁₈H₃₇ |
| 50 | H | —C₁₀H₂₀COOH | H | n-C₁₈H₃₇ | H | n-C₁₈H₃₇ |
| 51 | H | —C₁₀H₂₀COOH | H | n-C₁₈H₃₇ | n-C₁₈H₃₇CH | n-C₁₈H₃₆OH |
| 52 | H | —C₁₀H₂₀COOH | H | n-C₁₈H₃₅(OH)— | H | n-C₁₈H₃₅(CH₂)— |
| 53 | H | —C₁₀H₂₀COONa | H | n-C₁₈H₃₅(ONa)₂ | H | n-C₁₈H₃₅(ONa)₂ |
| 54 | H | —C₁₀H₂₀COOH | H | n-C₁₈H₃₇ | H | n-C₁₈H₃₇ |
| 55 | H | —C₁₀H₂₀COOC₂H₅ | H | n-C₁₈H₃₅ | H | n-C₁₈H₃₅ |
| 56 | H | —C₁₀H₂₀COOK | H | n-C₁₈H₃₇ | H | n-C₁₈H₃₇ |
| 57 | H | —C₁₀H₂₀COOC₁₈H₃₇ | H | n-C₁₂H₂₅ | H | n-C₁₈H₃₅ |
| 58 | H | —C₅H₁₀COONa | H | n-C₁₂H₂₅ | H | n-C₁₈H₃₇ |
| 59 | H | —C₅H₁₀COOH | H | n-C₆H₁₃ | H | n-C₁₈H₃₇ |
| 60 | H | —C₂H₄—SO₃H | H | n-C₁₈H₃₇ | H | n-C₁₈H₃₇ |
| 61 | H | —C₁₀H₂₀CONH₂ | H | n-C₁₈H₃₇ | H | n-C₁₈H₃₇ |
| 62 | H | —C₁₀H₂₀SO₂NH₂ | H | C₁₂H₂₅ | C₁₈H₃₇ | n-C₁₈H₃₇ |
| 63 | CH₃ | —C₅H₁₀CO—NH  CH₃ | C₃H₇ | C₃H₇ | CH₃ | C₁₂H₂₅ |
| 64 | CH₃ | CO—C₁₂H₂₄—N(C₂H₅)₂ | CH₃ | CH₃ | C₃H₇ | C₁₀H₃₃ |
| 65 | HO—CH₂—CH₂— | SO₂—C₁₀H₂₀—N(C₂H₄OH)₂ | H | CH₁₃ | H | C₁₅H₃₁ |
| 66 | CF₃—C₂H₄— | SO₂—C₈H₁₆—NHCH₃ | H | C₁₈H₃₇ | H | C₁₈H₃₇ |
| 67 | CH₂Cl(CH₂)₃— | SO₂—C₅H₁₀—N(CH₃)₂ | C₂H₅ | C₅H₁₁ | H | C₁₈H₃₃ |
| | H | —C₁₀H₂₀CON  CH₃  C₂H₄OH | H | CH₃ | H | C₁₈H₃₇ |
| 68 | H | Oleyl-S·O₂N(C₃H₇)₂ | Allyl | CH₃ | Allyl | C₁₈H₃₇ |
| 69 | H | SO₂—C₁₀H₂₀—N(CH₃)₂ | H | Allyl | H | C₁₅H₃₁ |
| 70 | H | —C₁₂H₂₄S·O₂NH₂ | HOC₂H₄— | HOC₂H₄— | H | Octadecenyl |
| 71 | C₂H₅ | SO₂—C₁₀H₂₄—N(C₄H₉)₂ | C₂H₅ | C₂H₅ | HOC₂H₄— | C₁₂H₂₅ |

TABLE

| Example No. | R | -Q-Y | $R_1$ | $R_2$ | $R_3$ | $R_4$ |
|---|---|---|---|---|---|---|
| 72 | H | $-C_{10}H_{24}CONH-$ | $\begin{array}{c}CH_2Cl \\ \| \\ CH_2-CH_2-\end{array}$ | $\begin{array}{c}CH_2Cl \\ \| \\ CH_2CH_2-\end{array}$ | $CH_3$ | $-C_{18}H_{37}$ |
| 73 | H | $\begin{array}{c}SO_2-C_2H_4- \\ \| \\ N(C_{16}H_{33})_2\end{array}$ | H | ⬡ | H | ⬡ H |
| 74 | H | $\begin{array}{c}SO_2-C_5H_{10}- \\ \| \\ N(C_5H_{11})_2\end{array}$ | $C_2H_5$ | $C_2H_5$ | H | Tricyclodecyl |
| 75 | $\begin{array}{c}CH_2Cl \\ \| \\ (CH_2)_3-\end{array}$ | $-C_5H_{10}COOC_5H_{11}$ | $CH_3$ | $C_2H_5$ | H | $C_{18}H_{37}$ |
| 76 | H | $-C_{10}H_{20}CO-OC_2H_4OH$ | Allyl | $-CH_3$ | Allyl | $C_{18}H_{37}$ |
| 77 | H | $-C_{10}H_{20}CO-OC_3H_6NH_2$ | H | Allyl | H | $C_{15}H_{31}$ |
| 78 | H | $\begin{array}{c}C_2H_4O-CO-C_{12}H_{24}- \\ \| \\ N(CH_3)_2\end{array}$ | $HO-C_2H_4-$ | $HO-C_2H_4-$ | H | Octadecenyl |
| 79 | $C_2H_5$ | $\begin{array}{c}C_2H_4O-CO-C_{10}H_{20}- \\ \| \\ NHCH_3\end{array}$ | $C_2H_5$ | $C_2H_5$ | $HO(CH_2)_3-$ | $C_{12}H_{25}$ |
| 80 | H | $\begin{array}{c}CO-oleyl \\ \| \\ OC_{12}H_{25}\end{array}$ | $Cl(CH_2)_3-$ | $Cl(CH_2)_3-$ | $CH_3$ | $C_{15}H_{31}$ |
| 81 | H | $-CH_2-CO-OC_{18}H_{37}$ | H | H | H | ⬡ |
| 82 | H | $\begin{array}{c}CO-C_5H_{10}- \\ \| \\ OC_6H_4NH_2\end{array}$ | $C_2H_5$ | $C_2H_5$ | H | Tricyclodecyl |
| 83 | $CH_3$ | $-C_{10}H_{20}-CO-OCH_3$ | $CH_3$ | $C_3H_7$ | $CH_3$ | $C_{12}H_{25}$ |
| 84 | Allyl | $-Oleyl-COOCH_3$ | $CH_3$ | $CH_3$ | $CH_3$ | $C_{18}H_{37}$ |
| 85 | $HOC_2H_4-$ | $-C_{10}H_{20}CO-OC_2H_5$ | H | $C_2H_5$ | H | $C_{15}H_{31}$ |
| 86 | $CF_3-CH_2-CH_2-CH_2-$ | $-C_{10}H_{20}CO-OC_2H_5$ | H | $C_6H_5$ | H | $C_{18}H_{37}$ |
| 87 | $ClCH_2-CH_2-CH_2-CH_2-$ | $-C_2H_4-CO-OC_2H_5$ | H | $C_6H_5$ | H | $C_{16}H_{33}$ |
| 88 | H | $-C_2H_{20}-CO-OC_2H_5$ | H | $CH_3$ | H | $C_{18}H_{37}$ |
| 89 | H | $-C_5H_{10}-CHOH-C_3H_{11}$ | $C_2H_5$ | $C_{18}H_{37}$ | H | $C_{16}H_{33}$ |
| 90 | H | $-C_4H_8-CHOH-C_5H_{17}$ | $C_3H_7$ | $C_{18}H_{37}$ | H | $C_{15}H_{31}$ |
| 91 | $C_2H_5$ | $-C_7H_{14}-CHOH-C_6H_{13}$ | $C_3H_7$ | $CH_3$ | H | $C_{18}H_{37}$ |
| 92 | H | $-C_8H_{16}-CHOH-C_4H_9$ | $C_3H_7$ | $C_2H_5$ | H | $C_{18}H_{37}$ |
| 93 | $HO-CH_2-CH_2-$ | $-C_7H_{14}-CHOH-C_5H_{11}$ | $C_2H_5$ | $CH_3$ | H | $C_{15}H_{31}$ |
| 94 | $Cl-CH_2-CH_2-$ | $-C_8H_{16}-CHOH-C_4H_9$ | $HO-CH_2-CH_2-$ | $HO-CH_2-CH_2-$ | $C_{18}H_{37}$ | $C_{12}H_{25}$ |
| 95 | $C_2H_5$ | $-C_4H_8-CHOH-C_5H_{11}$ | H | H | $C_3H_7$ | Oleyl |
| 96 | $C_4H_9$ | $-C_7H_{14}-CHOH-C_3H_{11}$ | $Cl-(CH_2)_3-$ | $Cl-(CH_2)_3-$ | H | $C_{18}H_{37}$ |
| 97 | $CH_3$ | $-C_8H_{16}-CHOH-C_3H_{19}$ | H | H | $HO-CH_2-CH_2-$ | $C_{18}H_{37}$ |
| 98 | H | $-C_8H_{16}-CHOH-C_4H_{19}$ | H | H | H | ⬡ |
| 99 | $CH_3$ | $-C_8H_{16}-CHOH-C_4H_{19}$ | H | $C_2H_5$ | H | Tricyclodecyl |
| 100 | H | $-(CH_2)_{10}-COOH$ | H | $C_{18}H_{37}$ | $C_2H_5$ | $C_{18}H_{37}$ |

TABLE

| Example No. | R | —Q—Y | R₁ | R₂ | R₃ | R₄ |
|---|---|---|---|---|---|---|
| 101 | H | —(CH₂)₁₀—COO—CH₂—<br>                                          HO₃S—CH₂ | H | C₁₈H₃₇ | H | C₁₈H₃₇ |
| 102 | H | —(CH₂)₁₀—COOH | H | Cyclohexyl | H | Cyclohexyl |
| 103 | H | —(CH₂)₁₀—COOH | H | Cyclohexyl | H | C₁₈H₃₇ |
| 104 | H | —(CH₂)₁₀—COONa | H | Cyclohexyl | H | C₁₈H₃₇ |
| 105 | H | —(CH₂)₁₀—COO—CH₂—<br>                                            HCl.H₂N—CH₂ | H | C₁₈H₃₅ | H | C₁₈H₃₅ |
| 106 | H | —(CH₂)₁₀—CO—OC₃H₇ | H | Cyclopentyl | H | Cyclopentyl |
| 107 | H | —C₅H₁₀—COOH | H | C₂H₄₅ | H | C₂H₄₅ |
| 108 | H | —C₁₀H₂₀—COOH | H | 9-chlorooctadecyl | H | 9-chlorooctadecyl |
| 109 | H | —C₁₀H₂₀—COOH | H | 9-fluorooctadecyl | H | 9-fluorooctadecyl |
| 110 | H | —C₁₀H₂₀—COONH₄ | H | n-C₁₂H₂₅ | H | n-C₁₂H₂₅ |
| 111 | H | —C₁₀H₂₀—CO—N(CH₃)₂ | H | n-C₁₂H₂₅ | H | n-C₁₂H₂₅ |
| 112 | H | —(CH₂)₁₀—COOH | H | C₁₈H₃₇ | H | Morpholino |
| 113 | H | —(CH₂)₁₀—COO—CH₂—<br>                                            HO₃S—CH₂ | H | C₁₈H₃₇ | H | C₁₈H₃₇ |
| 114 | H | —(CH₂)₁₀—COOH | H | Cyclohexyl | H | Cyclohexyl |
| 115 | H | —(CH₂)₁₀—COOH | H | Cyclohexyl | H | C₁₈H₃₇ |
| 116 | H | —(CH₂)₁₀—COONa | H | Cyclohexyl | H | C₁₈H₃₇ |
| 117 | H | —(CH₂)₁₀—COO—CH₂—<br>                                            HCl.H₂N—CH₂ | H | C₁₈H₃₅ | H | C₁₈H₃₅ |
| 118 | H | —(CH₂)₁₀—COOH | H | n-C₂H₄₅ | H | n-C₂H₄₅ |
| 119 | H | —(CH₂)₅—COOH | H | n-C₂H₄₅ | H | n-C₂H₄₅ |
| 120 | H | —(CH₂)₁₀—COONa | H | n-C₂H₄₃(ONa)₂ | H | n-C₂H₄₃(ONa)₂ |
| 121 | H | —(CH₂)₁₀—COOH | H | n-C₂H₄₃(Cl₂) | H | n-C₂H₄₃(Cl₂) |
| 122 | H | —(CH₂)₁₀—COOH | H | n-C₂H₄F | H | n-C₂H₄F |
| 123 | H | —(CH₂)₁₀—COOH | H | n-C₁₈H₃₅(Cl₂) | H | n-C₁₈H₃₅(Cl₂) |
| 124 | H | —(CH₂)₁₀—COONa | H | C₁₈H₃₇ | C₁₈H₃₇ | C₁₈H₃₇ |
| 125 | H | —(CH₂)₅—COOH | H | C₂H₄₅ | C₁₈H₃₇ | C₁₈H₃₇ |
| 126 | H | —(CH₂)₁₀—COONa | H | C₂H₄₃ | C₁₈H₃₇ | C₁₈H₃₇ |
| 127 | H | —(CH₂)₅—COONa | H | C₂H₁₃ | C₁₈H₃₇ | C₁₈H₃₇ |
| 128 | H | —(CH₂)₅—COONa | H | C₄H₁₃ | C₁₈H₃₇ | C₁₈H₃₇ |

EXAMPLE 129

(liquid floor wax, oil based)

5.25 Parts of the sodium salt of 11-[2', 4'-bis-n-octadecylamino-s-triazinyl-(6')]-amino-undecylic acid,
0.75 part of vinyloctadecyl ether polymerisate (M.P. 49° C.),
1.50 parts of microcrystalline petroleum wax M.P. 74–76° C., penetration ASTM 30)
7.50 parts of paraffin (M.P. 50°–52° C.),
5.00 parts of 1,4-dioxan,
80.00 parts of petroleum fraction (boiling range 150°–180° C.).

The components are mixed with each other by heating at 120° C. and the resulting clear solution is quickly cooled while stirring, whereupon a homogenous gellike liquid is formed. This is used as liquid floor wax on wood or linoleum floors to give a very good gloss.

Floor waxes having similar properties are obtained in using e.g. the compounds of Examples No. 38 and 56, and also on replacing the petroleum fraction by turpentine oil.

Liquid floor waxes of similar quality are obtained by replacing in the above composition the 5.25 parts of the aforesaid triazine derivative by the same amount of one of the other compounds described in the preceding examples.

EXAMPLE 130

(aerosol floorwax, oil based)

3.15 Parts of the sodium salt of 6-[2', 4'-bis-n-octadecylamino-s-triazinyl-(6')-amino]-caproic acid,
0.45 part of polyvinyl stearate (M.P. 46–48° C.),
0.90 part of micro crystalline petroleum wax (M.P. 74°–76° C.; penetration ASTM 30),
4.50 parts of paraffin (M.P. 50°–52° C.),
3.00 parts of diethylene glycol monoethyl ether,
48.00 parts of petroleum fraction (boiling range 180°–220° C.),
40.00 parts of dichlorodifluoromethane.

The components which are solid or liquid at normal temperature are mixed with each other with heating at 120° C. and the resulting solution is quickly cooled while stirring. The mixture formed is placed in a pressure container fitted with a spray valve and propellant gas is added. The mixture formed, which can be sprayed, is excellently suitable as floor wax. It gives a good gloss on wooden floors and has excellent shelf life.

Liquid floor waxes of similar quality are obtained by replacing in the above composition the 3.15 parts of the aforesaid triazine derivative by the same amount of e.g. one of the compounds of Examples No. 107 and 108, or on using white spirit (boiling range 140°–200° C., density at 20° C. 0.755–0.795) instead of the petroleum fraction.

EXAMPLE 131

(furniture polish, oil-water emulsion type)

1.25 parts of 11[2',4'-bis-n-didodecylamino-s-triazinyl-(6')]-amino-undecylic acid,
5.00 parts of dimethylpolysiloxane (viscosity 300 cps/20° C.).
1.25 parts of sorbitan monolaurate,
1.25 parts of polyoxyethylene sorbitan monolaurate,
43.75 parts of petroleum fraction (boiling range 180°–220° C.),
47.50 parts of water.

The organic components are mixed with each other by heating at 100° C. and the boiling water is added to this hot solution while stirring vigorously. The mixture is cooled while stirring whereupon a homogeneous, white liquid is formed which is excellently suitable for the care of furniture.

Furniture polish of similar quality is obtained by replacing in the above composition the 1.25 parts of the aforesaid triazine derivative by the same amount of e.g. one of the compounds of Examples No. 26, 90 and 124.

EXAMPLE 132

(water-repellant aerosol for use on textiles)

(oil based)
5.00 parts of 11-[2'-n-octadecylamino-4'-di-n-octadecylamino-s-triazinyl-(6')]-amino-undecylic acid,
15.00 parts of perchloroethylene,
40.00 parts of trichlorofluoromethane,
40.00 parts of dichlorodifluoromethane.

11-[2'-n-octadecylamino-4'-di-n-octadecylamino-s-triazinyl-(6')]-amino-undecylic acid is dissolved in the perchloroethylene. This solution is placed in a pressure container fitted with a spray valve and the propellant gases (trichlorofluoromethane and dichlorodifluoromethane) are added. The sprayable mixture formed is excellently suitable for attaining a water repellent effect on textiles such as cotton, particularly when the invisible coating formed is ironed.

Aerosols of similar quality are obtained by replacing in the above composition the 5.00 parts of the aforesaid triazine derivative by the same amount of e.g. one of the compounds described in the Examples No. 38, 39 and 82.

EXAMPLE 133

(car polish, oil-water emulsion type, aerosol)

1.00 Part of oxidized micro crystalline petroleum wax (M.P.82°C.), penetration ASTM: 7; saponification number 75/85.
2.00 parts of 11-[2',4'-bis-didodecylamino-s-triazinyl-(6')]-amino-undecylic acid,
2.00 parts of dimethylpolysiloxane (viscosity: 500 cps/20°C.),
1.00 part of sorbitan monolaurate,
1.00 part of polyoxyethylene sorbitan monolaurate,
35.00 parts of petroleum fraction (boiling range 180°–220 °C.),
38.00 parts of water,
4.00 parts of propane,
16.00 parts of butane.

The organic components which are solid and liquid at normal temperature are dissolved at 100°C. and the boiling water is added to this hot solution while stirring vigorously. The mixture is cooled while stirring and then placed in a pressure container fitted with a spray valve and the propellant gases (propane and butane) are added. The sprayable mixture so formed is excellently suitable for application on exterior surfaces of automobile body parts and other lacquered metal surface. The mixture is rubbed on lightly and thereby imparts to such surfaces a high gloss.

Car polishes of similar quality are obtained by replacing in the above composition the 1.00 part of the aforesaid triazine derivative by the same amount of one of the other compounds described in the preceding Examples No. 112 and 115.

EXAMPLE 134

(emulsion wax)

a.
3.19 Parts of 11-[2',4'-bis-n-octadecylamino-s-triazinyl-(6')]-amino-undecylic acid,
3.19 parts of paraffin (M.P. 50–52°C.),
6.38 parts of montanic acid ester wax, (M.P. 80°–83°C., acid No. 20/30, saponification No. 135/150),
1.70 parts of olein,
1.36 parts of aminomethyl propanol,
1.53 parts of cetyl alcohol polyglycol ether with four to five ethylenoxy groups, as emulsifying agent,
67.66 parts of water;

b.
2.25 parts of alkali-soluble solid phenol/formaldehyde resin, dissolved in a mixture of
0.67 part of aqueous concentrated ammonia (25 percent), and
12.07 parts of water.

The components of mixture (a), with the exception of the water, are melted at 150° and stirred until a homogeneous melt is obtained. The melt is cooled to 100°–110°, the water is brought to the boil and is then added thereto, and the resulting mixture (a) is cooled to room temperature. This mixture (a) is obtained in the form of an emulsion to which the solution (b) is added. The resultant emulsion is excellently suitable for the care of modern floors, such as "vinyl" flooring.

Emulsions having similar properties are obtained on using the compounds of e.g. Examples No. 35, 45, 118 and 127.

To obtain emulsions waxes having bactericidal activity 0.1 part of the sodium salt of 2,4,5-trichlorophenol or 0.1 part of 2-hydroxy-4,2',4'-trichlorodiphenyl ether is added to the above emulsion.

EXAMPLE 135

(carbon paper)

42.00 Parts of 11-[2'-n-octadecylamino-4'-octadecene-(8")-yl-amino-triazinyl-(6')]-amino-undecylic acid,
5.00 parts of petroleum jelly,
26.00 parts of spindle oil,
5.00 parts of anhydrous lanolin,
1.2 parts of the base of Victoria Blue B,
0.6 part of methyl violet,
2.2 parts of olein,
6.00 parts of milori blue,
12.00 parts of carbon black.

Carbon black, Milori blue and spindle oil are finely milled in a color triple roll mill. The remaining components are added to this mixture and the whole is heated to 120°C. while stirring until a homogeneous preparation is formed. A thin layer of this mixture is evenly applied by means of a heatable calender to one side of a carbon-supporting paper. Thereby, carbon paper is obtained which is suitable for the production of copies.

Carbon papers of similar quality are obtained by replacing in the above composition the 42. parts of the aforesaid triazine derivative by the same amount of e.g. one of the compounds described in the Examples No. 66, 70 and 98.

EXAMPLE 136

(self-polishing emulsion with marked antislip effect)

4.250 Parts of 11-[2',4'-bis-n-octadecenylamino-s-triazinyl-(6')]-amino-undecyl acid,
4.250 parts of carnauba wax,
4.250 parts of micro crystalline petroleum wax (M.P. 86°–90° C.; penetration ASTM 4–6),
0.850 part of olein,
0.765 part of cetyl alcohol polyglycol ether with four to five ethylenoxy groups as emulsifying agent and
0.680 part of aminomethyl propanol
are melted at 150° and stirred until a homogeneous melt is obtained. This melt is cooled to 100°–110° and added while stirring to
69.955 parts of boiling water. After cooling to room temperature to the emulsion so obtained, a solution consisting of
2.250 parts of alkali-soluble solid phenol/formaldehyde resin,
0.675 part of aqueous concentrated ammonia (25 percent) and
12.075 parts of water is added.

The resultant emulsion is suitable for "vinyl" flooring as a self-polishing coating having a marked antislip effect.

Similar self-polishing emulsions are also obtained on using as s-triazine component e.g. the compounds of Examples 48, 118 and 119 of the table, or on replacing in the above emulsion the 0.680 part of amino-methylpropanol by 0.680 part of morpholine or diethylaminoethanol.

EXAMPLE 137

(textile softeners)

a.
0.2 part of 11-[2',4'-bis-n-octadecyl-amino-s-triazinyl-(6')]-amino-undecylic acid β-methyl-β-amino-propyl ester hydrochloride is dissolved in
5.0 parts of isopropyl alcohol with heating and the solution so obtained is poured into
94.8 parts of water while stirring.

This solution is excellently suited for the softening of textiles, particularly for turkish toweling which has become hardened by repeated washing. The goods to be treated are placed for a few minutes in a bath containing 1 to 2 g. of water. After the treatment, the goods are wrung out and hung up to dry whereupon even very hardened and rough cotton toweling regains the original soft and fluffy handle.

Solutions having similar properties are obtained on using instead of the said s-triazine component the compound of Example 38 and on replacing the isopropyl alcohol by ethyl alcohol.

b.
On dissolving
5 parts of 11-[2',4'-n-octadecylamino-s-triazinyl-(6')]-amino-undecylic acid ethyl ester in
95 parts of glacial acetic acid,
while stirring and gently heating, a solution is obtained which, when used in a bath in a ratio of 3 to 5 g. per liter of water, serves to soften textiles which become hardened by repeated washing. Solutions with the same properties as solution (b) are also obtained on using the compounds of the Examples 92, 95 and 101 instead of the s-triazine compound mentioned or on replacing the glacial acetic acid by formic acid.

EXAMPLE 138

(self-polishing solution)

1 Part of silicone oil (viscosity 300 cp) is added to a solution of
15 parts of 11-[2',4'-bis-cyclohexylamino-s-triazinyl-(6')]-amino undecylic acid in
84 parts of isopropyl alcohol.

This solution can be applied to "vinyl," stone or marbre floors which after complete drying are coated with a highly glossy rub-resistant coating.

If the above s-triazine compound is replaced by one of the Examples 50, 81 and 118 a similar coating is obtained.

EXAMPLE 139

(Emulsion for stone floors)

3.02 Parts of the sodium salt of 11-[2'-n-octadecenyl-amino-4'-n-octadecylamino-s-triazinyl-(6')]-amino-undecylic acid,
1.5 parts of paraffin (M.P. 50°–52°C.),
4.5 parts of montanic acid ester wax (M.P. 82°–87°C,; acid No. 25–35 saponification No. 115–130) and
1.8 parts of cetyl alcohol polyglycol either with four to five ethyleneoxy groups, as emulsifier, are melted at 150° C, and stirred until a homogeneous melt is obtained. This melt, cooled to 100°–110°C. is added to
70.18 parts of boiling water while stirring.

To the emulsion so obtained, a solution consisting of
1.2 parts of shellac (M.P. 180°–182°C.),
0.45 part of aqueous concentrated ammonia (25 percent),
0.6 part of tributoxyethylphosphate and
7.75 parts of water is added while stirring.

The resultant emulsion is particularly suited for the case of stone floors as it imparts to them a high gloss which can be enhanced by subsequent polishing.

Emulsions having similar properties are obtained on using, as s-triazine component, the compounds of Examples No. 62, 116, 125 and 126 and on replacing the 4.5 parts of montanic acid ester wax by 4.5 parts of a wax consisting of the reaction product of a hydrocarbon and an isocyanate (M.P. 93°C; acid No. 25–35; saponification No. 50–65; penetration ASTM 1–3, e.g. the commercially available Polymer 63 or Teratan Polymer.

We claim:
1. A floor polishing composition comprising
a. as gloss-imparting component, highly resistant to after-treatment by alkalis and acids, a compound of one of the formulas

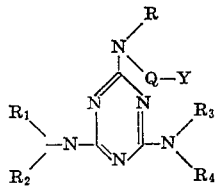

(I)

and

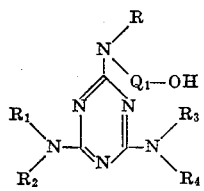

(II)

wherein each of R, $R_1$ and $R_3$ represents hydrogen, alkyl of from one to 22 carbon atoms, cycloalkyl of from five to 12 ring carbon atoms, alkenyl of from three to 22 carbon atoms, hydroxy-alkyl of from two to 22 carbon atoms, fluoro-alkyl of from three to 20 carbon atoms, or chloroalkyl of from three to 22 carbon atoms, $R_2$ represents alkyl of from one to 22 carbon atoms, cycloalkyl of from five to 12 ring carbon atoms, alkenyl of from three to 22 carbon atoms, hydroxy-alkyl of from two to 22 carbon atoms, fluoro-alkyl of from three to 22 carbon atoms, or chloroalkyl of from three to 22 carbon atoms, $R_4$ represents alkyl of from 10 to 22 carbon atoms or alkenyl of from 10 to 22 carbon atoms, Q represents a member selected from alkylene of from one to 20 carbon atoms and alkenylene of from three to 20 carbon atoms, Y represents a member selected from $-COO^1M^+$, $-SO_3^1M^+$, carbamyl, sulfamyl, the latter two members substituted at the nitrogen atom thereof by one or two substituents selected from alkyl of from one to 16 carbon atoms and hydroxyalkyl of from two to six carbon atoms, alkoxy-carbonyl of from two to 18 carbon atoms, hydroxy-alkoxy-carbonyl of from two to 18 carbon atoms and amino-alkoxy-carbonyl, wherein alkoxy has from two to six carbon atoms and wherein the amino nitrogen is unsubstituted or substituted by one or two lower alkyl, and $Q_1$ represents a divalent radical selected from the group consisting of alkylene of from 10 to 20 carbon atoms and alkenylene of from 10 to 20 carbon atoms, and wherein the substituent —OH is located at the $Q_1$ radical at least four carbon atoms remote from each of the two free bonds of Q and $M^+$ represents one equivalent weight of a noncolor imparting cation selected from the group consisting of H, alkali metal, alkaline earth metal and aluminum ions or an acid addition salt of said compound; said gloss-imparting component being present in said agent in an amount of about 0.2 to about 50 percent of the total weight of the agent;

b. a body-giving adjuvant selected from the group consisting of petroleum wax, montanic acid ester wax, carnauba wax, vinyloctadecyl ether polymer, polyvinyl stearate, phenol/formaldehyde resin, and silicone oil;

c. an organic solvent selected from the group consisting of petroleum hydrocarbon fractions having a boiling range of 140° to 220° C., dioxan, turpentine oil, diethylene glycol monoethyl ether, perchloroethylene, and isopropanol; and d. optionally, an emulsifying agent selected from the group consisting of aminomethylpropanol, cetyl alcohol polyglycol ether having four or five ethyleneoxy groups.

2. A floor polishing composition as defined in claim 1, wherein said compound is of Formula I.

3. A floor polishing composition as defined in claim 2, wherein Y in said Formula I represents $-COO^1M^+$.

4. A floor polishing composition as defined in claim 2, wherein Y in said Formula I represents $-SO_3^1M^+$.

5. A floor polishing composition as defined in claim 3, wherein Y in said Formula I is selected from carbamyl, sulfamyl and each of these two members is substituted at the nitrogen atom thereof by one or two substituents selected from alkyl of from one to 16 carbon atoms and hydroxy-alkyl of from two to six carbon atoms.

6. A floor polishing composition as defined in claim 2, wherein Y in said Formula I is selected from alkoxy-carbonyl of from two to 18 carbon atoms, hydroxy-alkoxy-carbonyl of from two to 18 carbon atoms and amino-alkoxy-carbonyl wherein "alkoxy" has from two to six carbon atoms and wherein the amino nitrogen atom is substituted by one or two lower alkyl.

7. A floor polishing composition as defined in claim 1, wherein said compound is of formula I and the total number of carbon atoms of $R_1$, $R_2$, $R_3$ and $R_4$ therein taken together is at least 12.

8. A floor polishing composition as defined in claim 1, wherein said compound is of formula I and the total number of carbon atoms of $R_1$, $R_2$, $R_3$, $R_4$ and —Q—Y therein taken together is at least 17.

9. A floor polishing composition as defined in claim 1, wherein (a) is 2-[2',4'-bis-n-octadecylamino-s-triazinyl-(6')]-amino-acetic acid or a salt thereof with a base.

10. A floor polishing composition as defined in claim 1, wherein (a) is 6-[2',4'-bis-n-octadecylamino-s-triazinyl-(6')]-amino-caproic acid or a salt thereof with a base.

11. A floor polishing composition as defined in claim 1, wherein (a) is the sodium salt of 6-[2',4'-bis-n-octadecylamino-s-triazinyl-(6')]-amino-caproic acid.

12. A floor polishing composition as defined in claim 1, wherein (a) is 11-[2',4'-bis-n-octadecylamino-s-triazinyl-(6')]-amino-undecylic acid or a salt thereof with a base.

13. A floor polishing composition as defined in claim 1, wherein (a) is the sodium salt of 11-[2',4'-bis-n-octadecylamino-s-triazinyl-(6')]-amino-undecylic acid.

14. A floor polishing composition as defined in claim 1, wherein (a) is the potassium salt of 11-[2',4'-bis-n-octadecylamino-s-triazinyl-(6')]-amino-undecylic acid.

15. A floor polishing composition as defined in claim 1, wherein (a) is 11-[2',4'-bis-n-octadecen-(8'')-ylamino-s-triazinyl-(6')]-amino undecylic acid or a salt thereof with a base.